United States Patent
Thibault et al.

(10) Patent No.: US 8,290,676 B2
(45) Date of Patent: *Oct. 16, 2012

(54) METHOD OF CONTROLLING A VEHICLE BRAKE WITH TORQUE CORRECTION

(75) Inventors: Julien Thibault, Palaiseau (FR);
Dominique Onfroy, Boulogne Billiancourt (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 1131 days.

This patent is subject to a terminal disclaimer.

(21) Appl. No.: 12/171,677

(22) Filed: Jul. 11, 2008

(65) Prior Publication Data

US 2009/0024290 A1  Jan. 22, 2009

(30) Foreign Application Priority Data

Jul. 19, 2007 (FR) ...................................... 07 05219

(51) Int. Cl.
*G06F 7/70* (2006.01)
(52) U.S. Cl. ............... 701/70; 701/72; 303/20; 180/370
(58) Field of Classification Search .................. 701/70, 701/72, 75, 78, 83; 303/20, 155, 11; 180/370, 180/325
See application file for complete search history.

(56) References Cited

U.S. PATENT DOCUMENTS

| | | | | |
|---|---|---|---|---|
| 5,576,959 A | * | 11/1996 | Hrovat et al. | 701/70 |
| 5,588,721 A | * | 12/1996 | Asano et al. | 303/163 |
| 5,951,122 A | * | 9/1999 | Murphy | 303/163 |
| 5,964,511 A | * | 10/1999 | Miyazaki | 303/191 |
| 6,036,285 A | * | 3/2000 | Murphy | 303/112 |
| 6,178,370 B1 | * | 1/2001 | Zierolf | 701/71 |
| 6,189,643 B1 | * | 2/2001 | Takahashi et al. | 180/248 |
| 6,711,488 B2 | * | 3/2004 | Zierolf | 701/71 |
| 6,719,082 B2 | * | 4/2004 | Uematsu et al. | 180/249 |
| 6,722,745 B2 | * | 4/2004 | Salamat et al. | 303/126 |
| 7,346,443 B2 | * | 3/2008 | Thibault | 701/70 |
| 7,920,951 B2 | * | 4/2011 | Maron | 701/70 |
| 2003/0182044 A1 | * | 9/2003 | Nakamura et al. | 701/70 |
| 2003/0220731 A1 | * | 11/2003 | Zierolf | 701/71 |
| 2004/0232762 A1 | * | 11/2004 | Maron | 303/20 |
| 2005/0001474 A1 | * | 1/2005 | Zierolf | 303/112 |
| 2005/0067996 A1 | * | 3/2005 | Eba | 318/609 |
| 2008/0016599 A1 | * | 1/2008 | Dreibholz et al. | 903/940 |
| 2008/0021624 A1 | * | 1/2008 | Maron | 701/70 |
| 2010/0185376 A1 | * | 7/2010 | Onfroy | 701/70 |

FOREIGN PATENT DOCUMENTS

| | | |
|---|---|---|
| DE | 195 36 694 A1 | 4/1997 |
| EP | 1 695 887 A1 | 8/2006 |
| WO | 2005/100113 A1 | 10/2005 |

* cited by examiner

*Primary Examiner* — Helal A Algahaim
(74) *Attorney, Agent, or Firm* — Sughrue Mion, PLLC

(57) ABSTRACT

The invention relates to a method of controlling a vehicle brake that is adapted to exert a braking force in response to an actuation setpoint, the method comprising the following steps:

from a braking setpoint, determining a nominal actuation setpoint for the brake actuator, taking account of all of the components of the braking setpoint;

from the same braking setpoint, and from a measurement of the torque developed by the brake, determining a correction for the nominal actuation setpoint, this correction taking account only of low-frequency variations in the braking setpoint; and adding the correction to the nominal setpoint.

8 Claims, 1 Drawing Sheet

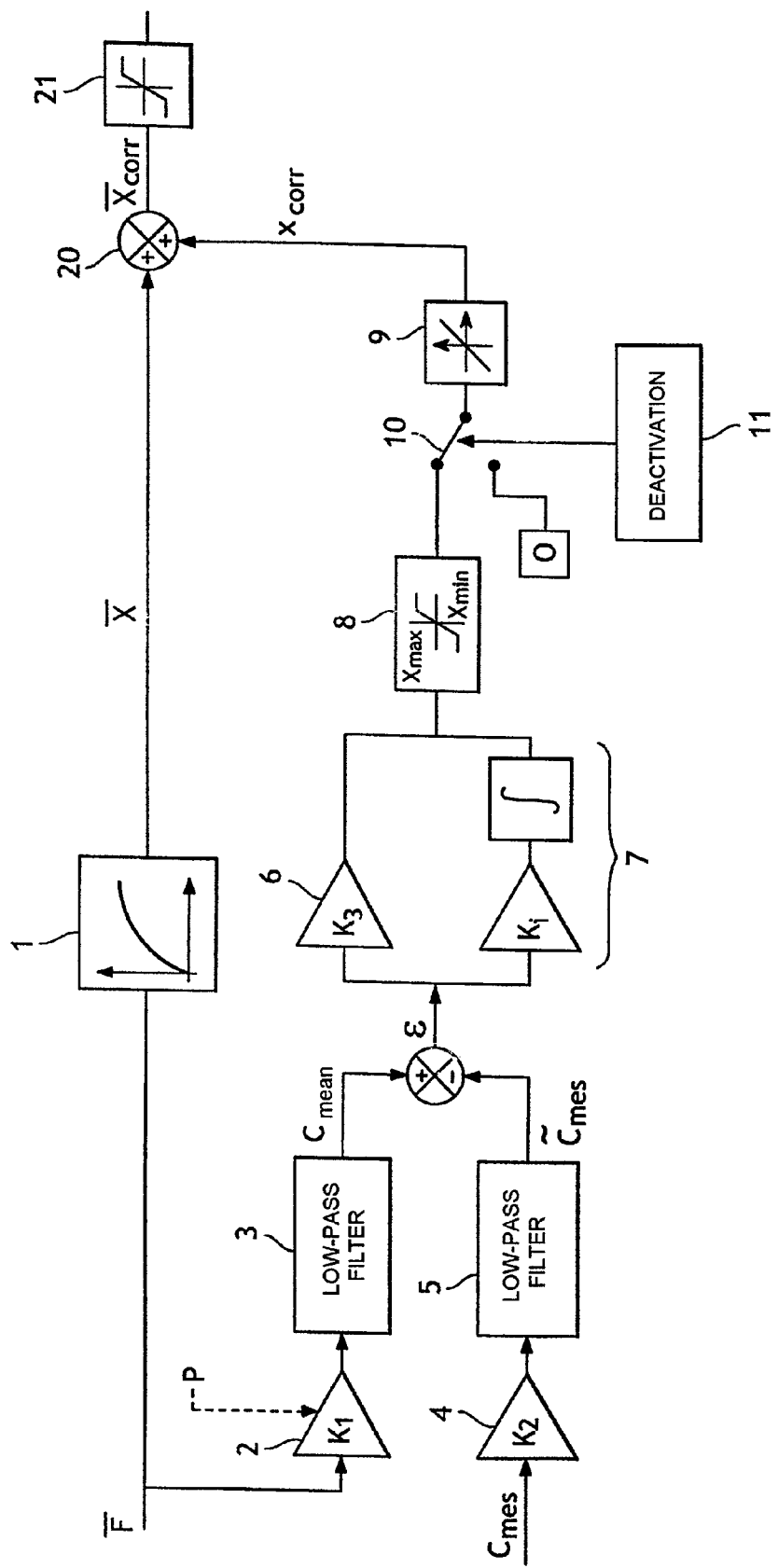

METHOD OF CONTROLLING A VEHICLE BRAKE WITH TORQUE CORRECTION

The invention relates to relates to a method of controlling a vehicle brake with torque correction.

BACKGROUND OF THE INVENTION

Vehicle braking systems include braking actuators (which may be hydraulic or electromechanical) for applying braking torque to the wheels of a vehicle, thereby tending to slow down the vehicle.

Most of the brake controls that are known for use in aviation make use of a setpoint that is converted either into a pressure if the brakes are hydraulic, or into a force that is to be applied, or into a displacement of the pusher, if the brakes are electromechanically actuated.

Controls making use of a torque setpoint and organizing a feedback loop based on measured torque have been proposed, as in document US 2005/0001474. Those controls present the advantage of taking account of the overall action of the brake by monitoring the torque that it generates, thereby making it possible to adapt to dispersions in the braking torque response for a given braking force.

Nevertheless, controls having a broad passband can interfere with protection for preventing the wheels from locking, particular if there is a phase offset between torque control signals and anti-locking control signals. Under certain grip conditions, torque control delivers a torque setpoint that is temporarily zero in order to prevent the wheels from locking. However, if a wheel locks in untimely manner, then the torque as measured becomes zero quite suddenly and the measured torque is then equal to a torque setpoint of zero. The wheel thus remains locked, and the brake is not controlled for the purpose of releasing the wheel.

OBJECT OF THE INVENTION

An object of the invention is to provide brake control that makes use of a force or position setpoint, while nevertheless taking account of measured torque.

BRIEF DESCRIPTION OF THE INVENTION

In order to achieve the invention, there is provided a method of controlling a vehicle brake that is adapted to exert a braking force in response to an actuation setpoint, the method comprising the following steps:
  from a braking setpoint, determining a nominal actuation setpoint for the brake actuator, taking account of all of the components of the braking setpoint;
  from the same braking setpoint, and from a measurement of the torque developed by the brake, determining a correction for the nominal actuation setpoint, this correction taking account only of low-frequency variations in the braking setpoint; and
  applying the correction to the nominal actuation setpoint.

Thus, the brake is indeed controlled in accordance with the braking setpoint and not in accordance with torque. The torque measurement is used herein merely to produce a low frequency correction of the nominal actuation setpoint, which is itself calculated while taking account of high-frequency components in the braking setpoint.

Low-frequency correction as proposed in this way thus enables dispersions in braking torque to be reduced for a given braking setpoint, where such dispersions can be caused by dispersions in applied braking force, or to dispersions in the braking torque response to an applied braking force.

In addition, low-frequency correction as proposed remains compatible with anti-locking protection that provides high-frequency modulation of the braking setpoint in order to prevent the wheel from locking.

One of the advantages of the invention is that it enables the brake to operate in a degraded mode in the event of the torque sensor failing. The correction is then arbitrarily set to zero or maintained to its current value, and the brake is then controlled solely as a function of the braking setpoint.

In the special circumstance of using a position setpoint, the torque correction of the invention makes it possible to compensate for thermal expansion that can cause the force that is applied by the brake to vary.

BRIEF DESCRIPTION OF THE DRAWING

The invention can be better understood in the light of the following description with reference to the sole FIGURE that constitutes a block diagram of a particular implementation of the method of the invention.

DETAILED DESCRIPTION OF THE INVENTION

The invention is described below in application to an aircraft brake of the type including electromechanical actuators that are controlled in displacement. A computer (not shown) generates a braking setpoint $\overline{F}$. This setpoint is corrected at high frequency by a system for providing protection against wheel lock, which system continuously verifies the slip rate of the wheel, detects any starting of wheel lock, and decreases the braking setpoint $\overline{F}$ accordingly in order to prevent the wheel from locking.

In known manner, a converter 1 transforms the braking setpoint $\overline{F}$ into a position setpoint $\overline{X}$ for the pusher of the actuator, in this example in application of a model 1 that is not linear. Calculation of the position setpoint $\overline{X}$ is performed at a calculation frequency that is high and compatible with the operating anti-locking protection, such that the position setpoint $\overline{X}$ takes account simultaneously of low-frequency components and of high-frequency components in the braking setpoint $\overline{F}$.

According to the invention, a low-frequency position correction $x_{corr}$ is calculated and added by means of a summing circuit 20 to the position setpoint $\overline{X}$ in order to obtain a corrected position setpoint $\overline{X}_{corr} = \overline{X} + x_{corr}$. This position setpoint $x_{corr}$ takes account of the measured torque as follows.

Initially, an image of a mean torque $C_{mean}$ is generated that corresponds to the braking setpoint $\overline{F}$. For this purpose, the braking setpoint $\overline{F}$ is delivered to a proportional stage 2 of gain K1 in order to make it comparable to a torque, and it is then subjected to a first lowpass filter 3 in order to eliminate all high-frequency components, and in particular those that are due to implementing anti-lock protection.

Furthermore, use is made of a measurement of the torque $C_{mes}$ actually exerted by the brake, which measurement is provided to a proportional stage 4 of gain K2, and is then subjected to a second lowpass filter 5 in order to eliminate all of the high-frequency components, together with measurement noise. This produces a calibrated measured torque $\tilde{C}_{mes}$.

The mean torque $C_{mean}$ and the calibrated measured torque $\tilde{C}_{mes}$ are supplied as inputs to a comparator that generates an error $\epsilon$. This error is subjected to processing, by being delivered to a controller that includes a proportional action 6 of gain K3, an integral action 7, and finally a saturation stage 8 having the purpose of restricting the correction to values lying within the range [$x_{min}, x_{max}$]. This saturation prevents excessively large corrections that would disturb proper operation of the brake or that would lead to too great a force being applied, i.e. a force above a limit force that can be accepted by the brake.

Preferably, and in conventional manner, the integral action 7 includes anti-runaway protection that freezes the integral action in the event of the correction being saturated by the saturation stage 8, so as to avoid incrementing the integral of the error $\epsilon$ so long as the correction is saturated.

The output from the saturation stage 8 is then delivered to a slope limiter 9 that has the function of ensuring that variations in the correction are progressive. This produces the desired position correction $x_{corr}$.

When the aircraft is stationary, a braking force can nevertheless be applied, e.g. for presenting the aircraft from moving while parked. The force as applied in this way leads to a non-zero mean torque $C_{mean}$, whereas the measured torque $C_{mes}$ is zero, or very low. Under such circumstances, the torque error would be large and would lead to a large amount of correction, further increasing the travel of the actuator pushers, and thereby contributing to increasing the applied force. In order to avoid such a situation, the correction is neutralized. To perform this neutralization, provision is made for a switch 10 under the control of a member 11 for deactivating correction, thus making it possible to switch the input of the slope limiter 9 to a fixed value, which value is selected in this example to be equal to zero. This switching also serves to neutralize the correction when it is detected that the torque sensor that provides the torque measurement $C_{mes}$ is faulty. The slope limiter 9 connected downstream from the switch 10 then serves to avoid jolty correction in the event of such switching, and when switching in the opposite direction.

The invention is not limited to the above description, but on the contrary covers any variant coming within the ambit defined by the claims.

In particular, although the invention is illustrated with reference to brakes having electromechanical actuators that are controlled in position, the invention applies more generally to any other type of control. For example, it is possible to generate force actuation setpoints for brakes of the same type, or pressure actuation setpoints for hydraulic brakes, such actuation setpoints being corrected in accordance with the invention by measuring the torque generated by the brake.

Although it is stated above that the correction changes suddenly to the value zero when the correction is neutralized, provision can be made to deactivate correction in some other way, e.g. by maintaining the most recent correction value prior to neutralization, and then when correction is reactivated, by starting again from said most recent value. It is possible to neutralize the correction by other means, e.g. by using a conditional summing circuit 20 that stops summing the position correction $x_{corr}$ to the position setpoint $\overline{X}$ in response to an instruction to neutralize correction.

Although it is stated that in order to form an image of the mean torque $C_{mean}$ from the braking setpoint $\overline{F}$, the braking setpoint is multiplied by a constant gain K1, it is naturally possible to make use of a gain K1 that is variable and that is determined in real time as a function of parameters p such as the speed of the aircraft, the temperature of the brake, or the operating point of the brake, by using an appropriate digital model. Advantageously, account should be taken not only of parameters of the brake that is being regulated, but also parameters that relate to other brakes, thus making it possible to ensure that brake wear and heating is made uniform.

Although the description refers to a controller of the proportional-integral type, it is also possible to use other types of controller, for example a proportional-integral-derivative or other controller.

Although the image of the mean torque $C_{mean}$ and the torque measurement $C_{mes}$ are filtered independently by two independent lowpass filters, it is also possible to omit those two filters and replace them with a single lowpass filter that is located downstream from the comparator so as to filter the error $\epsilon$.

Although it is stated that a saturation stage 8 is used for saturating the correction $x_{corr}$, it is possible to use a saturation stage 21 for saturating the corrected setpoint $\overline{X}_{corr}$ either in addition as shown in the FIGURE, or as a replacement for the saturation stage 8, thereby making it possible to guarantee that the corrected setpoint remains within levels that are compatible with the structural integrity of the brake components.

Finally, although it is stated that in order to determine the correction $x_{corr}$ for the position setpoint, use is made of the braking setpoint $\overline{F}$ that contains the anti-locking correction and from which low-frequency components are extracted by means of a lowpass filter, it is possible to determine this position correction in some other way, for example by using the low-frequency braking setpoint taken prior to it being subjected to high-frequency correction by the device for providing anti-locking protection (the low-frequency braking setpoint may for example come from pedals operated by the pilot, or from a deceleration setpoint when braking in so-called "autobrake" automatic mode). The nominal setpoint $\overline{X}$ is itself determined by an input that is the sum of the low-frequency braking setpoint plus the high-frequency anti-locking correction.

What is claimed is:

1. An apparatus for controlling a vehicle brake that is adapted to exert a braking force in response to an actuation setpoint, the vehicle brake including a brake actuator, the apparatus comprising:
   an input for receiving a braking setpoint;
   an input for receiving a measured torque representing a measurement of the torque generated by the brake;
   a setpoint calculation device operative to calculate a nominal actuation setpoint for the brake actuator on the basis of the braking setpoint, taking account of all components of the breaking setpoint;
   a correction calculation device operative to calculate a correction for the nominal actuation setpoint on the basis of the braking setpoint and of the measured torque, and taking account only of variations at low frequency in the braking setpoint;
   an output delivering the sum of the nominal actuation setpoint plus the correction as a corrected actuation setpoint for the brake actuator; and wherein said brake actuator is actuated in accordance with the corrected actuation setpoint.

2. An apparatus as recited in claim 1, wherein the correction calculation device uses an estimation of a mean torque applied by the brake that is constructed from the braking setpoint, and performs a comparison of the mean torque with the measured torque.

3. An apparatus as recited in claim 2, wherein, prior to performing the comparison, the estimation of the mean torque and the measured torque are both filtered in order to eliminate high-frequency components.

4. An apparatus method according to claim 3, wherein the comparison delivers an error equal to a difference between the mean torque and the measured torque, said error is subjected to treatment, followed by saturation in order to restrict the correction to values lying within a predetermined range.

5. An apparatus according to claim 4, wherein correction is neutralized if the vehicle is stationary or if a failure of the torque measurement means is detected.

6. An apparatus according to claim 5, wherein neutralization of the correction includes the step of freezing the correction value to a given value.

7. An apparatus according to claim 1, wherein the braking setpoint includes high frequency components generated by implementing anti-locking protection, said high frequency components being filtered out in order to determine a correction for the nominal actuation setpoint.

8. An apparatus according to claim 1, wherein the corrected actuation setpoint is saturated.

* * * * *